United States Patent [19]

Kuwabara et al.

[11] Patent Number: 4,920,277
[45] Date of Patent: Apr. 24, 1990

[54] CONTROL SYSTEM FOR A VARIABLE SPEED HYDRO-POWER PLANT APPARATUS

[75] Inventors: Takao Kuwabara, Hitachi; Hiroto Nakagawa, Osaka; Eizo Kita, Kyoto, all of Japan

[73] Assignees: Hitachi, Ltd., Tokyo; Kansai Electric Power Co., Inc., Osaka, both of Japan

[21] Appl. No.: 230,434

[22] Filed: Aug. 10, 1988

[30] Foreign Application Priority Data

Aug. 14, 1987 [JP] Japan ............................ 62-201712
Dec. 18, 1987 [JP] Japan ............................ 62-318851

[51] Int. Cl.⁵ .......................................... F01D 15/10
[52] U.S. Cl. .................................. 290/40 C; 290/43; 290/52
[58] Field of Search ............... 290/40 R, 40 A, 40 C, 290/43, 52, 54; 60/361, 445, 448, 459, 911

[56] References Cited

U.S. PATENT DOCUMENTS

| | | | |
|---|---|---|---|
| 3,848,171 | 11/1974 | Speth et al. | 290/52 X |
| 4,287,429 | 9/1981 | Bashnin et al. | 29/52 X |
| 4,367,890 | 1/1983 | Spirk | 290/52 |
| 4,394,098 | 7/1983 | Wirschal et al. | 290/52 X |
| 4,625,125 | 11/1986 | Kuwabara | 290/52 |
| 4,674,279 | 6/1987 | Ali et al. | 290/52 X |
| 4,694,189 | 9/1987 | Haraguchi et al. | 290/40 C |
| 4,754,156 | 6/1988 | Shiozaki et al. | 290/40 C X |
| 4,823,018 | 4/1989 | Kuwabara et al. | 290/40 A X |

FOREIGN PATENT DOCUMENTS 72998 4/1984 Japan.
164080 7/1986 Japan.
71497 4/1987 Japan.

Primary Examiner—William M. Shoop, Jr.
Assistant Examiner—W. E. Ducanson, Jr.
Attorney, Agent, or Firm—Fay, Sharpe, Beall, Fagan, Minnich & McKee

[57] ABSTRACT

A variable speed hydro-power plant includes a pump turbine (2) having a S-shaped characteristics at the turbine operation. A current time turbine operating point is grasped on a turbine characteristics diagram of the pump turbine (2). A limit operation characteristics curve (nr) of the pump turbine (2) is formed in advance so as to not reach the S-shaped characteristics turbine operation region. A reach of the limit operation characteristics curve (nr) is detected, a rotating speed (N) of the pump turbine (2) is lowered. An inrush of the pump turbine (2) into the S-shaped characteristics turbine operation region is eliminated, so the continuation of a stable and reliable turbine operation can be guaranteed.

19 Claims, 8 Drawing Sheets

CONTROL SYSTEM FOR A VARIABLE SPEED HYDRO-POWER PLANT APPARATUS

BACKGROUND OF THE INVENTION

The present invention relates to a control system for a variable speed hydro-power plant apparatus, and more particularly to a control system for a variable speed hydro-power plant apparatus which is well suited to a case where a pump turbine or a water turbine being a driver exhibits a S-shaped characteristics in a turbine operation region.

The present invention relates to a control system for a variable speed hydro-power plant apparatus, and more particularly, it provides a control method well suited to a variable speed pumping-up power plant apparatus which shared an upstream or downstream side pipe line with another hydraulic machinery and which comprises a pump turbine exhibiting a S-shaped characteristics in a turbine or a water turbine operation region.

A variable speed hydro-power plant apparatus to which the present invention is applied uses a wound-rotor induction generator as an induction machine which is driven by a pump turbine or a water turbine (herein-below, simply termed "pump turbine"), and it excites the secondary winding thereof A.C.-wise through a frequency converter.

The variable speed hydro-power plant apparatus is therefore noticed owing to the feature that any desired rotating speed of the pump turbine can be established in the state in which the output frequency of the generator is held at an A.C. power line system frequency, so the variable speed hydro-power plant apparatus can be operated at a rotating speed affording a high pump turbine efficiency, or that when the generator is subjected to a variable speed pumping-up operation as a motor, an AFC (autmoatic frequency control) responsive operation is possible in spite of the operation as a simple constant speed motor.

Meanwhile, even in the case of the pump turbine of this variable speed hydro-power plant apparatus, a S-shaped characteristics turbine region is involved likewise to a conventional fixed speed pump turbine, and a measure for avoiding the S-shaped characteristics turbine region is indispensible.

Japanese Patent Application Laid-open No. 72998/1984 has proposed one technique for avoiding the entry of an operation into the unstable turbine operation region of the S-shaped characteristics at the stage of shift from no load to a rated load in the variable speed hydro-power plant apparatus.

In this prior art, in order to prevent the operating point of the pump turbine from rushing into the S-shaped characteristics turgine region, the guide vane opening degree control of the pump turbine is preferred to a rotating speed control based on the induction generator.

More specifically, the output of the induction generator is controlled according to a generator output command which is given to the generator, while the opening degree of the guide vane is first led to an opening degree corresponding to the changed generator output command as quickly as possible, and the appropriate rotating speed control is thereafter performed slowly.

The technique has the effect that the operation can be hindered from entering the unstable turbine operation region of the S-shaped characteristics at the start of the pump turbine.

Figure 9:
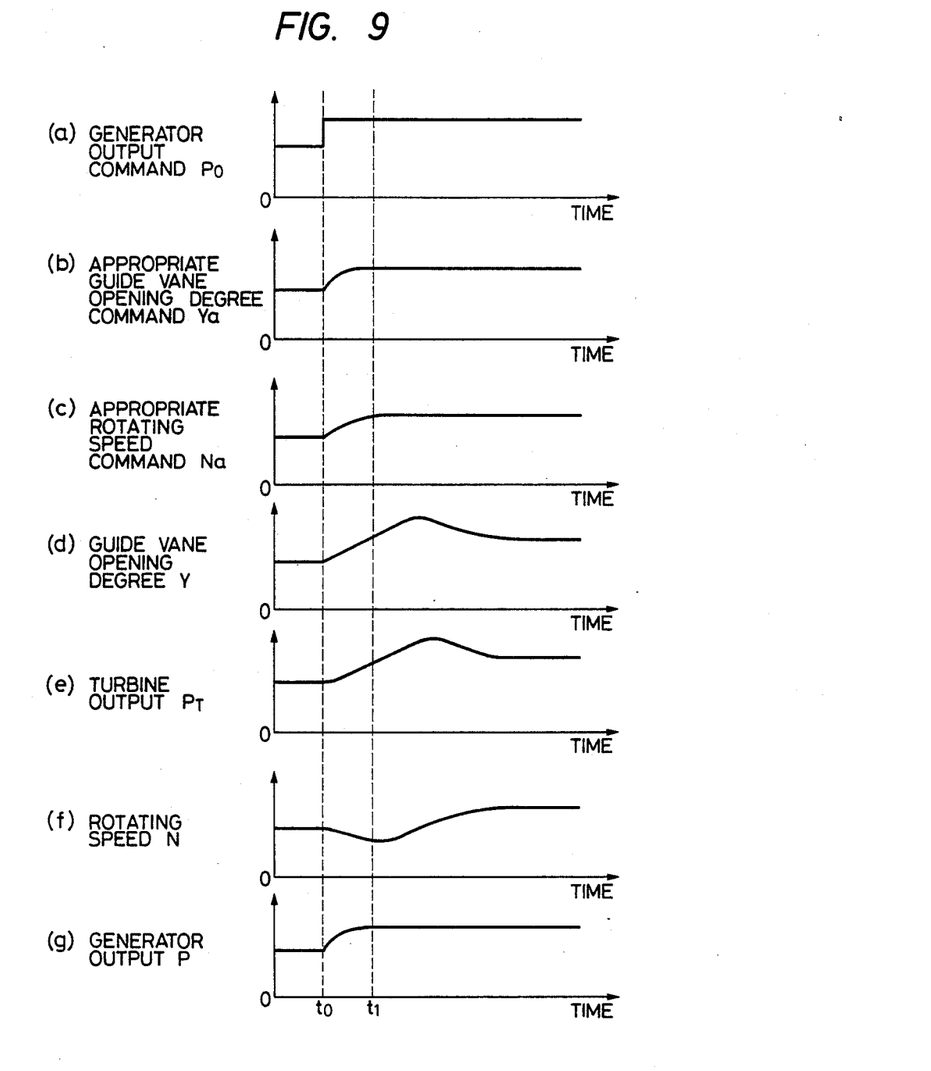
FIG. 9 is an explanatory diagram showing the signals of the various parts of the control units in prior art and illustrates at the sections (a) through (g) signal waveforms.

In the conventional variable speed hydro-power plant apparatus according to Japanese Patent Laid-Open No. 71497/1987, the situations of fluctuations in the various quantities of the individual parts in the case where the generator output command $P_0$ is increased are as shown in the section (a) in FIG. 9. It can be understood that, after the change of the generator output command $P_0$ the various quantities become stable under new operating states. Referring now to FIG. 9, the fluctuations of the various quantities of the individual parts in transient states will be explained.

The generator output command $P_0$ is now raised stepwise as shown in the section (a) in FIG. 9, at a point of time $t_0$ with the intention of raising the generator output P as shown at the section (g) in FIG. 9. Then, the generator output P of the induction generator rises following up the change of the generator output command $P_0$ as shown at the section (a) in FIG. 9.

On the other hand, after the generator output command $P_0$ has been given, the response of the opening degree Y of the guide vane is slower than the response of the generator output P. For this reason, the turbine output $P_T$ shown at the section (e) in FIG. 9 becomes smaller than the generator output P, and the rotating speed N shown at the section (f) in FIG. 9 is temporarily decelerated after the sudden change of the generator output command $P_0$.

Thereafter, at a point of time $t_1$, the generator output P and the turbine output $P_T$ become equal, and the rotating speed N becomes the minimum. At this time $t_1$, the rotating speed deviation or correction signal $\Delta N=(N_a-N)$ is plus, so that the guide vane opening degree deviation or correction signal $\Delta Y=(Y_a-Y)$ is plus, and the guide vane opening degree Y increases more than the appropriate guide vane opening degree command $Y_a$ shown at the section (b) in FIG. 9.

Accordingly, the turbine output $P_T$ becomes greater than the generator output P, and the rotating speed N begins to rise as shown at the section (f) in FIG. 9. With the rise of the rotating speed N, the rotating speed deviation $\Delta N$ thereof from the appropriate rotating speed command $N_a$ decreases, and with the decrease of the guide vane opening degree deviation $\Delta Y$, the turbine output $P_T$ decreases, and the acceleration of the rotating speed N decreases.

The rotating speed deviation $\Delta N$ in a steady state is rendered zero by the integral element in the rotating speed control unit. On the other hand, the guide vane opening degree deviation $\Delta Y$ between the appropriate guide vane opening degree command $Y_a$ from the turbine characteristics function generation unit and the guide vane opening degree Y corresponds to the error between a characteristics of the pump turbine, and it can be rendered almost zero by enhancing the precision of the function of the turbine characteristics.

Consequently, the integral element in the rotating speed control unit may generate only the guide vane opening degree deviation $\Delta Y=(Y_a-Y)$ in the steady state.

The above will be explained again by the use of equations.

The secondary excitation unit has an integral element etc. built therein for the purpose of adjusting the generator output P to the generator output command $P_0$. In the steady state, $$P = P_0 \tag{1}$$

Owing to the integral element built in the rotating speed control unit, in the steady state, $$N = N_a \tag{2}$$

Besides, owing to the guide vane drive unit, in the steady state, $$Y = Y_a + \Delta Y \tag{3}$$

Moreover, in the steady state, the turbine output $P_T$ and the generator output P ought to be equal:

$$P = P_T = f(H, Y, N) \tag{4}$$

Further, the appropriate guide vane opening degree command $Y_a$ ought to have originally been given so as to correspond to the generator output command $P_0$ under the water head or effective head H on that occasion and $N = N_a$. Therefore, $$P_0 = f(H, Y, N) \tag{4}$$

With the above put together, $Y = Y_a$ holds, namely, the guide vane opening degree deviation $\Delta Y = 0$ holds in the steady state. In the rotating speed control unit, the gain ($K_1$) of the proportional element having a braking effect is made greater, and the gain ($K_2$) of the integral element is made relatively smaller, thereby to raise the response rate of the opening degree of the guide vane to the utmost. On the other hand, the turbine output $P_T$ and the rotating speed N are set without vibrations as seen from at the sections (a) and (f) in FIG. 9.

Thus far, the responsive operations of the prior art variable speed hydro-power plant apparatus have been explained. In brief, according to this prior art variable speed hydro-power plant apparatus, the turbine input and the generator output are controlled in balanced fashion, whereby the various quantities can be held stable.

Now, the unstable operation phenomenon of the pump turbine will be explained.

In general, the runner and other devices of the pump turbine, especially a high water head pump turbine, are so designed as to demonstrate a sufficient centrifugal pumping action to the end of attaining a high water head during a pumping operation.

The design, however, adversely affects the operation of the pump turbine. In particular, it is considered inevitable that the turbine characteristics called "S-shaped characteristics" is involved.

In a case where the characteristics of the pump turbine adopted for this design is indicated by a characteristics curve which expresses the relationship between a rotating speed per unit head ($N_1$) and a flow rate per unit head ($Q_1$) under the predetermined opening degree of the guide vane, the characteristics curve has in the operation region of the pump turbine, the first part in which the value of the flow rate per unit head ($Q_1$) decreases with increase in the value of the rotating speed per unit head ($N_1$) and the second part in which the value of the flow rate per unit head ($Q_1$) decreases with decrease in the value of the rotating speed per unit head ($N_1$).

In order to facilitate the description, the second part shall be termed "S-shaped characteristics part" in this specification. Further, the characteristics of the pump turbine in the S-shaped characteristics part shall hereinafter be termed the "S-shaped characteristics".

During the turbine operation in the S-shaped characteristics part, also a torque per unit head ($T_1$) decreases with the decrease of the rotating speed per unit head ($N_1$).

Usually, the operation of the pump turbine is performed in the first part. However, in a case where the rotating speed per unit head ($N_1$) increases suddenly and greatly due to an abrupt load decrease or the like, there is the possibility that the pump turbine will rush into the S-shaped characteristics part or region. Once the pump turbine has rushed into the S-shaped characteristics part or region, it becomes, in effect, impossible to continue the operation of the variable speed hydropower plant apparatus.

Figure 10:
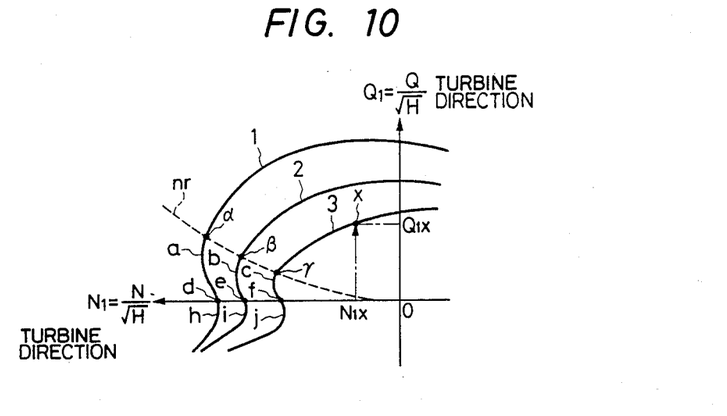
FIG. 10 is a diagram showing the graph of the flow rate characteristics ($N_1$-$Q_1$) of a pump turbine having a S-shaped characteristics part.
Figure 11:
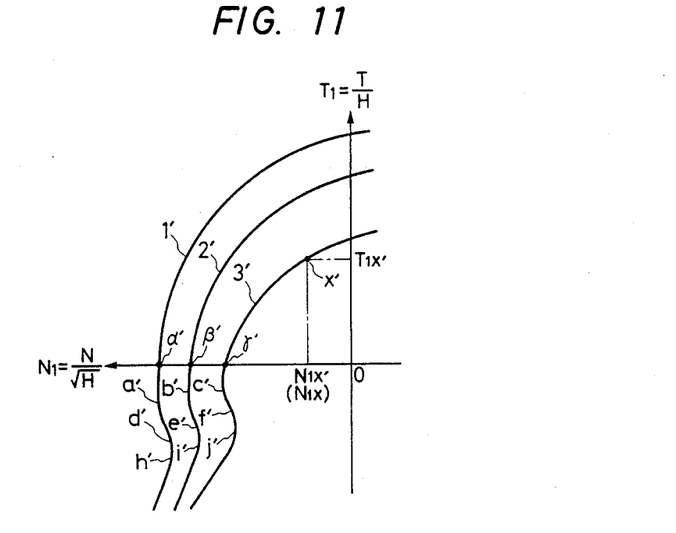
FIG. 11 is a diagram showing the graph of the torque characteristics ($N_1$-$T_1$) of a pump turbine having a S-shaped characteristics part.

The characteristics of the pump turbine having the S-shaped characteristics in the turbine operation region are illustrated in FIG. 10 and FIG. 11. In FIG. 10, the characteristics of the pump turbine is shown as the relationship between the rotating speed per unit head ($N_1$) and the flow rate per unit head ($Q_1$) with the guide vane opening degree (Y) taken as a parameter.

On the other hand, in FIG. 11, the characteristics of the pump turbine is shown as the relationship between the rotating speed per unit head ($N_1$) and the torque per unit head ($T_1$) by the use of the same parameter.

$$N_1 = N/\sqrt{H}, \quad Q_1 = Q/\sqrt{H}, \quad T_1 = T/H$$

In the above expressions, symbols N, Q, H and T denote the rotating speed, the flow rate, the effective head and the torque of the pump turbine, respectively.

Characteristics curves 1 and 1' are obtained under a comparatively great guide vane opening degree as predetermined. Characteristics curves 2 and 2' are obtained under a smaller guide vane opening degree. Characteristics curves 3 and 3' are obtained under a still smaller guide vane opening degree.

In the part a-d-h of the characteristics curve 1, the value of the flow rate per unit head ($Q_1$) decreases with the decrease of the rotating speed per unit head ($N_1$). As stated above, this curve part a-d-h is termed as the "S-shaped characteristics part" in this specification.

Similarly, a curve part b-e-i is the S-shaped characteristics part of the characteristics curve 2, and a curve part c-f-j is that of the characteristics curve 3. Such S-shaped characteristics turbine regions shift to the higher the rotating speed per unit head ($N_1$) side as the guide vanes become larger.

Likewise to the curve parts in FIG. 10, also in FIG. 11, curve parts a'-d'-h', b'-e'-i' and c'-f'-j' are the S-shaped characteristics parts of the characteristics curves 1', 2' and 3', respectively.

FIG. 11 has close relations with FIG. 10. For example, a point x meeting $Q_1 = Q_{1x}$ and $N_1 = N_{1x}$ on the characteristics curve 3 in FIG. 10 corresponds to a point x' on the characteristics curve 3' in FIG. 11. The point x' is a point meeting $T_1 = T_{1x'}$ and $N_1 = N_{1x'} (= N_{1x})$. Similarly, points a, b, c, d, e, f, h, i, and j in FIG. 10 correspond to a', b', c', d', e', f', h', i' and j' in FIG. 11, respectively.

A curve nr is a no-load flow rate curve. The intersection points $\alpha$, $\beta$ and $\gamma$ between the characteristics curves 1, 2 and 3 and the no-load flow rate curve nr correspond to the intersection points $\alpha'$, $\beta'$ and $\gamma'$ between the characteristics curves 1', 2' and 3' and a straight line $T_1 = 0$, respectively.

The variable speed hydro-power plant apparatus is operated under conditions differing every moment, and it is sufficiently presumed that the operation approaches or enters the unstable turbine operation region during an ordinary operation except the start operation. Nevertheless, the above stated prior art is not effective as a measure of avoidance and extrication in this case.

Again, in the above stated Japanese Patent Laid-Open No. 72998/1984, while the output of the generator is controlled according to a generator output command given to the generator, the opening degree of guide vane is led to an opening degree corresponding to the changed generator output as quickly as possible, and the appropriate control of a rotating speed is thereafter performed slowly.

In actuality, however, the control rate of the guide vane opening degree is inevitably limited lest abnormal water hammering should arise in a waterway upstream or downstream of the pump turbine, and it can never be raised up to the response rate level of the generator output control.

On the other hand, suppressing the response rate of the generator output control is none other than sacrificing the degree of contribution of the variable speed hydro-power plant apparatus to an electric power system and is truly unfavorable. As a result, it is proper to consider that the rotating speed greatly fluctuates transiently. That is, in the above stated prior art, the rotating speed lowers when the load increases, and it rises when the load decreases.

Assuming now that the operating point (for example, the rotating speed per unit head $N_1 = N/\sqrt{H}$) of the pump turbine before the load change lies near the S-shaped characteristics turbine operation region, there is no problem at the load increase because the turbine operating point moves in the direction of coming away from the S-shaped characteristics turbine operation region while accompanying the lowering of the rotating speed.

To the contrary, at the load decrease, the turbine operating point comes nearer while accompanying the rise of the rotating speed, and it can rush into the S-shaped characteristics turbine operation region in some cases.

Once the turbine operating point has rushed into the S-shaped characteristics turbine operation region, the torque of the pump turbine lowers rapidly and greatly together with the flow rate of water, and the rotating speed lowers rapidly. At this turbine operating point of time, it becomes, in effect, impossible to continue the normal operation of the variable speed hydro-power plant apparatus.

Further, notice needs to be taken of the fact that the above state inrush of the turbine operating point into the S-shaped characteristics turbine operation region does not take place due to only the transient change of the rotating speed (N). The rotating speed per unit head $N_1 = N/\sqrt{H}$ increases also when the effective head (H) has lowered for any reason.

Especially in a case where the upstream or downstream pipe line of the pump turbine is shared with another water turbine or pump turbine, the water hammering phenomenon which has arisen in the other water turbine or pump turbine is propagated through the shared pipe line. Accordingly, even when only the variable speed hydro-power plant apparatus is perfectly controlled, there is the potential that the problem stated above will be posed by another apparatus.

Japanese Patent Laid-Open No. 164080/1986 proposes a method in which, when a variable speed hydro-power plant apparatus is to be put on an electric power system, the rotating speed is set at the minimum value allowable under the effective head (H) on that occasion, whereby the induction generator is stably put on the electric power system without the influence of the S-shaped characteristics turbine operation region.

However, nothing is referred to as regards a method of avoiding inrush into the S-shaped characteristics turbine operation region, the method being effective after putting the unit on the electric power system. In particular, in the variable speed hydro-power plant apparatus, the rotating speed is quite independent of the frequency of the electric power system unlike those of a fixed speed apparatus (a synchronous generator).

That is, a synchronizing torque from the electric power system cannot be expected. In other words, even after putting on the electric power system, just as before it, the control of the rotating speed must be rendered satisfactory by the variable speed hydro-power plant apparatus itself. In this respect, Japanese Patent Laid-Open No. 164080/1986 is incomplete.

The present invention consists in eliminating the afore-mentioned disadvantages of the prior art techniques, and providing a simple and reliable method of controlling a variable speed hydro-power plant apparatus in which, even when the influence of water hammering is exerted from another hydraulic machinery sharing a pipe line, a turbine operating point $N_1 = N/\sqrt{H}$ (where N denotes a rotating speed, and H an effective head) is prevented from abnormally approaching the S-shaped characteristics turbine operation region.

SUMMARY OF THE INVENTION

An object of the present invention is to provide a control system for a variable speed hydro-power plant apparatus wherein the continuation of a stable and reliable turbine operation can be guaranteed.

Another object of the present ivention is to provide a control system for a variable speed hydro-power plant apparatus wherein, when the turbine operation approaches the unstable turbine operation region, such an unstable turbine operation region can be brought back to a stable turbine operation region.

Further object of the present invention is to provide a control system for a variable speed hydro-power plant apparatus wherein a drop into a S-shaped characteristics turbine operation region can be avoided.

Still object of the present invention is to provide a control system for a variable speed hydro-power plant apparatus wherein a drop into a S-shaped characteristics turbine operation region can be avoided, in spite of the interference of the water hammering from another hydraulic machinery sharing a pipe line.

In the present invention, a current turbine operating point is grasped on the turbine characteristics diagram of the pump turbine, and when it has approached the unstable turbine operation region, the rotating speed of the pump turbine is forcibly lowered.

As a practicable measure for lowering the rotating speed, a frequency converter is controlled so as to increase the output of the generator, or the opening degree of the guide vane is controlled so as to decrease the output of the pump turbine, thereby to lower the rotating speed of the pump turbine.

According to the present invention, a variable speed hydro-power plant apparatus comprises a generator connected to an electric power system which is provided with a frequency converter in order to generate power of the same terminal frequency as that of the electric power system independently of its rotor driving speed, and a pump turbine which is directly coupled to a shaft of the generator rotor and which includes variable guide vanes.

According to the present invention, a variable speed hydro-power plant apparatus comprises a generator whose primary winding is connected to an electric power system and whose secondary winding is connected to the electric power system through a secondary excitation control unit, and a pump turbine which is directly coupled to a shaft of the generator rotor and which includes variable guide vanes.

Upon detecting an approach of a turbine operating point of the variable speed hydro-power plant apparatus to an unstable turbine operation region, the present invention attains by one of the following control methods, namely, (1) a rotating speed of the pump turbine is lowered, (2) a mechanical output of the pump turbine is made smaller than an output of the generator, (3) only the generator output is increased through the generator output controller so as to make a mechanical output of the turbine smaller than the generator output, and (4) only a mechanical output of the turbine is decreased through the turbine controller so as to make the mechanical output of the turbine smaller than the generator output.

In order to detect an approach of a turbine operating point of the variable speed hydro-power plant apparatus to an unstable turbine operation region, a rotating speed per unit head and a reference rotating speed per unit head representing allowable maximum speed which is a function of opening degree of the variable guide vane are compared, whereupon a rotating speed of the pump turbine is lowered.

In the characteristics of the pump turbine, a stable operation side is a region in which the rotating speed of the pump turbine is not excessively high, and a return to the stable turbine operation side is permitted by lowering the rotating speed of the pump turbine in the variable speed hydro-power plant apparatus in which the rotating speed can be selected separately from and independently of a system frequency.

Since the pump turbine is accelerated or decelerated on the basis of the difference between mechanical output of the turbine and the generator output, it is effective to increase the generator output or decrease mechanical output of the turbine when a rotating speed of the pump turbine is to be lowered back and kept away from the unstable region.

The effect of the present invention resides in that, in an ordinary variable speed hydro-power plant mode in which a generator is put on an electric power system, the possibility of the inrush of a pump turbine or a water turbine into a S-shaped characteristics turbine operation region is perfectly eliminated, so the continuation of a stable and reliable turbine operation can be guaranteed.

At the change of the operating state of the other hydraulic machinery sharing the pipe line, especially at the start of the other hydraulic machinery in a turbine mode operation or at the mechanical output rapid increase operation thereof, also when the effective head of the particular variable speed pump turbine drops temporarily to increase the rotating number per unit head by the water hammering phenomenon in the shared pipe line, the rotating speed of the pump turbine of the particular variable speed hydro-power plant apparatus is temporarily lowered and corrected before, or concurrently with, the start or output rapid increase operation of the other side hydraulic machinery.

Then, after the danger of the interference of the water hammering in the shared pipe line attributed to the hydraulic machinery has been evaded, the rotating speed correction control of the concerned variable speed hydro-power plant is removed, and its rotating speed is restored to the original appropriate value.

According to the present invention, in a turbine mode operation of a variable speed hydro-power plant sharing an upstream or downstream side pipe line with another hydraulic machinery, the variable speed hydro-power plant apparatus comprises a pump turbine which exhibits a S-shaped characteristics in a turbine operation region and includes variable guide vanes, and a generator with a frequency converter, which is so constructed as to generate electric power thereof equal in frequency to that of an electric power system in spite of the fact that a rotating speed of the pump turbine is changed in conformity with an operating state.

In case of abruptly changing an operating state of the other side hydraulic machinery with which the upstream or downstream side pipe line is shared, the rotating speed of the variable speed hydro-power plant apparatus is temporarily corrected and controlled, and the temporary rotating speed correction control is released after water hammering in the shared pipe line caused by the abrupt change of the operating state of the other side hydraulic machinery has settled down.

When the other side hydraulic machinery with which the upstream or downstream side pipe line is shared is to start or rapidly increase its output in the turbine mode operation, the rotating speed correction control of lowering the rotating speed of the variable speed hydro-power plant apparatus is performed before-hand, or the rotating speed correction control is validated in a limited specified operation region in accordance with a water head or a rotating speed of the pump turbine or an opening degree of the guide vane on each occasion.

When the other side hydraulic machinery with which the upstream or downstream side pipe line is shared is to start or operate so as to rapidly increase its output in a turbine mode operation, the rotating speed correction control of lowering the rotating speed of the variable speed hydro-power plant apparatus is simultaneously performed, or the rotating speed correction control is validated in a limited specified operation region in accordance with a water head or a rotating speed of the pump turbine or an opening degree of the guide vane on each occasion.

Influence ascribable to the change of the operating state of the other side hydraulic machinery sharing the pipe line, namely, the lowering of the effective head of the particular variable speed pumping-up plant apparatus ascribable to the water hammering is calculatedly obtained before-hand, and the rotating speed of the hydraulic machinery of the particular variable speed pump turbine plant apparatus is lowered and corrected to the extent that the raise of the rotating speed per unit head attendant upon the lowering of the effective head is cancelled.

The rotating speed lowering correction may be made previously to a command for changing the operating state of the other side hydrualic machinery, or it may well be made simultaneously at that time.

The effect of the present invention consists in providing a proper and simple control method which reliably avoids a drop into a S-shaped characteristics turbine operation region threatening the continuous operation of a generator mode operation, in spite of the interference of water hammering phenomenon from another side hydraulic machinery sharing a pipe line.

Further, there is such an effect that the operable range of the rotating speed and the operable range of the effective head of a particular variable speed pump turbine plant apparatus can be widened. Even when the operable ranges are widened, the danger of the drop into the S-shaped characteristics turbine operation region is not involved.

DESCRIPTION OF THE INVENTION

A variable speed hydro-power plant apparatus according to various embodiments of the present invention will be described with reference to the drawings. Among them, a first embodiment shown in FIG. 1 consists in that a stable turbine operation side is restored by increasing the output of a generator when such need arises. The variable speed hydro-power plant apparatus and control devices therefor will be explained.

Figure 1:
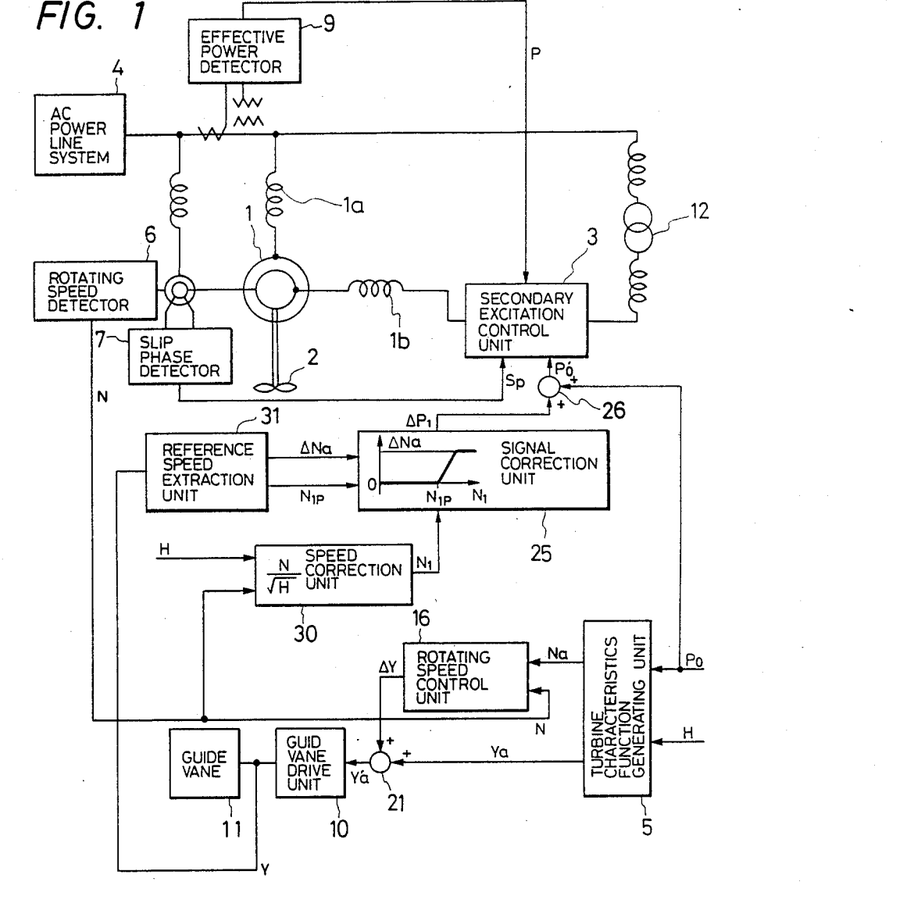
FIG. 1 is a block diagram of a control system of a variable speed hydro-power plant apparatus according to a first embodiment of the present invention.

Referring to FIG. 1, numeral 1 designates an induction machine or induction generator which is driven and rotated by a pump turbine 2 directly coupled to the rotor thereof and in a turbine mode.

Also, the induction generator 1 is subjected to a variable speed operation in such a manner that a secondary winding 1b of the induction generator 1 is supplied with an alternating exciting current which is adjusted to a predetermined frequency in accordance with the rotating speed of the induction generator 1 by means of a secondary excitation control unit 3 including a frequency converter, while A.C. power at a frequency equal to the frequency of an A.C. power line system 4 is delivered from a primary winding 1a of the induction generator 1. Numeral 12 indicates an exciting transformer.

The variable speed hydro-power plant apparatus is schematically constructed as stated above. One of the control terminals of the variable speed hydro-power plant apparatus is the secondary excitation control unit 3. A slip phase detector 7 is provided for the control of the secondary excitation control unit 3, and it is used for detecting a slip phase signal $S_p$ which is equal to the difference between the voltage phase of the A.C. power line system 4 and the rotating phase of the secondary side of the induction generator 1 in terms of an electrical angle.

The rotor of the slip phase detector 7 is provided with a three phase which is connected in parallel with the primary winding 1a of the induction generator 1, and on the stator side of the slip phase detector 7, Hall converters are respectively disposed at positions differing by an electrical angle of $\pi/2$. Whereby the coincident signal of the voltage phase of the A.C. power line system 4 as viewed from the secondary side of the induction generator 1 is detected and converted into the slip phase signal $S_p$ by the Hall converters.

In addition, an effective power detector 9 is provided for the control of the secondary excitation control unit 3, and a generator output or an effective power P is applied as a feedback signal for a generator output command $P_0$.

The generator output command $P_0$ and the slip phase signal $S_p$ are inputted to the secondary excitation control unit 3, by which the alternating exciting current to be supplied to the secondary winding 1b of the induction generator 1 is controlled so that the generator output detection signal P of the induction generator 1 to be detected by the effective power detector 9 may become equal to the generator output command $P_0$.

The other control terminal of the variable speed hydro-power plant apparatus is variable guide vanes 11 of the pump turbine 2.

Next, the control units of these control terminals will be explained. Numeral 5 indicates a pump turbine characteristics function generating unit which generates an appropriate guide vane opening degree command $Y_a$ and an appropriate rotating speed command $N_a$ on the basis of a generator output command $P_0$ and a water head signal H from outside. Incidentally, it is also possible to omit the water head signal H in a case where the water head fluctuations are small.

Numeral 16 indicates a rotating speed control unit, which compares the appropriate rotating speed command $N_a$ and the rotating speed signal N detected by a rotating speed detector 6, so as to deliver a guide vane opening degree correction signal $\Delta Y$. Besides, the guide vane opening degree correction signal $\Delta Y$ is added to the appropriate guide vane opening degree command $Y_a$ at an adder 21, and the resultant signal is input to a guide vane drive unit 10 so as to adjust the opening degree of the guide vane 11 in accordance therewith, whereby a turbine output $P_T$ is controlled.

Figure 2:
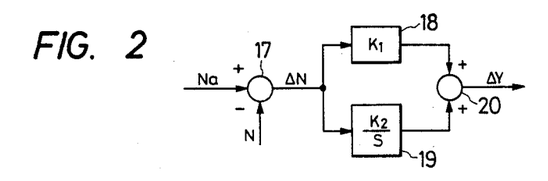
FIG. 2 is a block diagram of a rotating speed control unit used in FIG. 1.

FIG. 2 shows an example of the rotating speed control unit 16 among the afore-mentioned constituents. Numeral 17 denotes a comparator, which delivers a rotating speed deviation $\Delta N$ as an output. The rotating speed deviation $\Delta N$ is input to a proportional element ($K_1$) 18 and an integral element ($K_2/S$) 19, the outputs of which are added by an adder 20 into the guide vane opening degree correction signal $\Delta Y$.

In the variable speed hydro-power plant apparatus of the above stated first embodiment of the present invention, as shown in the control circuit arrangement of FIG. 1, a decision unit or signal correction circuit 25 for correcting the generator output signal, an adder 26, a rotating speed correction portion 30, and a limitative reference rotating speed correction or extraction portion 31 are furnished.

The decision unit 25 includes a signal correction portion for the generator output P. The decision unit 25 delivers the generator output correction signal $\Delta P_1$ in accordance with the guide vane opening degree Y on each occasion, on the basis of $N_1 > N_{1p}$.

At the rotating speed correction unit 30, in which the actual rotating speed N is divided by the square root of an effective head H so as to obtain the rotating number per unit head $N_1$. This rotating number per unit head $N_1$ corresponds to the axis of abscissas in FIG. 10.

On the other hand, in the limitative reference rotating speed correction unit 31, a limitative reference rotating speed $N_{1p}$ is determined from the input of the guide vane opening degree Y because a limitative reference rotating speed $N_{1p}$ at a shift to an unstable turbine operation region differs depending upon the guide vane opening degree Y. Besides, the limitative reference rotating speed correction unit 31 affords an output which varies the generator quantity correction signal $\Delta P_1$ in accordance with the guide vane opening degree Y.

The generator output correction signal $\Delta P_1$ is sampled from the generator output signal correction circuit 25 so as to increase the generator output P, whereas the guide vane opening degree Y at the turbine output side is not corrected at all. Such an input/output unbalanced control gives rise to the lowering of the rotating speed N as easily conjectured from the explanation on FIG. 9. The above stated first embodiment of the present invention exercises such an unbalanced control when the unstable operation region of the turbine characteristics has been approached.

Figure 3:
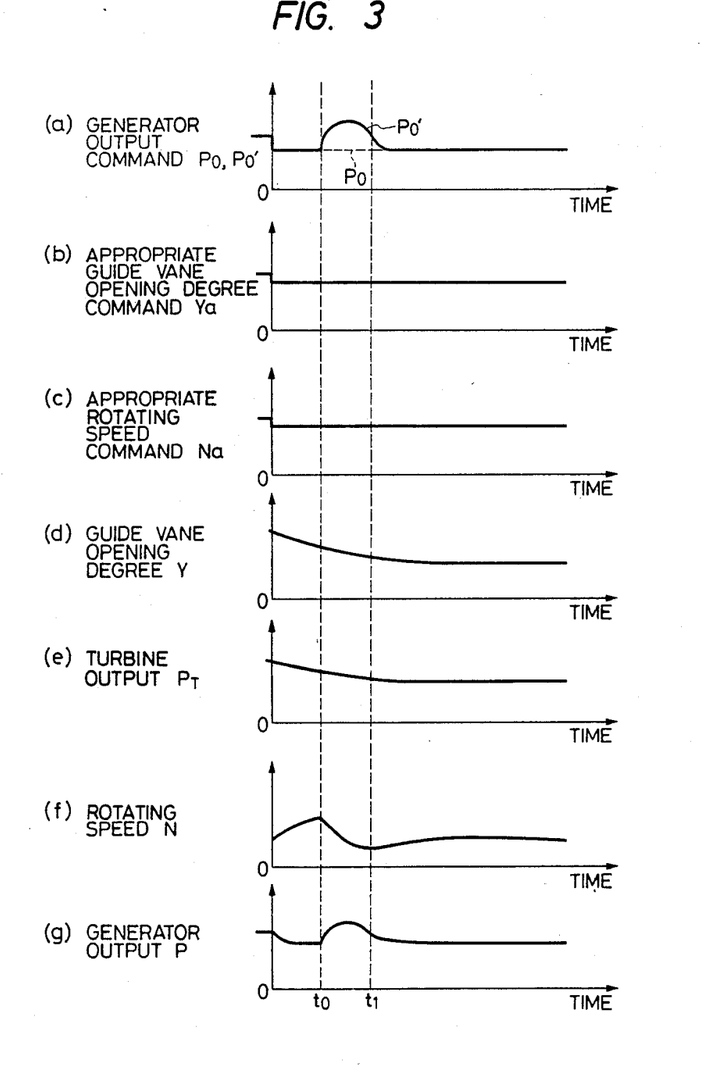
FIG. 3 is an explanatory diagram showing the signals of the various parts of the control units in FIG. 1 and illustrates at the sections (a) through (g) signal waveforms developing in FIG. 1.

Next, it will be elucidated that the inrush into the unstable turbine operation region can be prevented by the first embodiment of the present invention shown in FIG. 1. When the generator output command $P_0$ is decreased suddenly at a point of time 0 in FIG. 3 showing the quantities of states of the various portions in FIG. 1, the appropriate guide vane opening degree command $Y_a$ and the appropriate rotating speed command $N_a$ are also decreased, with the result that the guide vane opening degree Y, the turbine output $P_T$ and the generator output P are also decreased.

Since, however, the decreasing rate of the generator output P is higher than that of the turbine output $P_T$, and accelerating force due to the rotating parts such as the pump turbine and the rotor acts, and the rotating speed N rises transiently.

Figure 4:
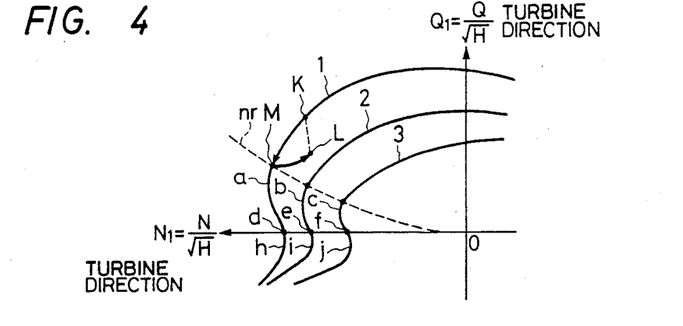
FIG. 4 is a diagram showing the graph of the flow rate characteristics ($N_1$-$Q_1$) of a pump turbine having a S-shaped characteristics according to the first embodiment of the present invention.

Meanwhile, a turbine operating point in a state before the point of time 0 lies at a point K in FIG. 4 on the characteristics state 1 as determined by the guide vane opening degree Y and the rotating speed N, and a turbine operating point after the decreased of the generator output P ought to become a point L corresponding to a new guide vane opening degree Y.

Since, however, the change of the guide vane opening degree Y is comparatively slow and rotating speed N increases rapidly, the turbine operating point approaches the limit operation characteristics of the pump turbine, for example the no-load flow rate curve nr, along the characteristics curve 1.

In the above stated first embodiment of the present invention, the present time turbine operating point is grasped on the turbine characteristics diagram of the pump turbine 2, for example, on the various turbine characteristics curves.

The limit operation characteristics of the pump turbine defined in the present invention is decided in advance, for example, according to the no-load flow rate curve nr or surrounding portions thereof. Such a limit turbine operation characteristics is formed on the no-load flow rate curve nr or in parallel with the no-load flow rate curve nr. The limit turbine operation characteristics is to be set the upper limitation of the turbine operating point such as the rotating number per unit head $N_1$ which is located close to but well away from the S-shaped characteristics part.

A point of time $t_0$ in FIG. 3 indicates a time at which the rotating speed N has reached a speed on the limit characteristics curve nr and becomes to reach at a point M. Therefore, the operating point shifting action is commenced to avoid dropping into the unstable turbine operation region and to bring back to the stable turbine operation region.

The generator output correction signal $\Delta P_1$ is output at the point of time $t_0$ in FIG. 3, and only the generator output command $P_{0'}$ is influenced by the generator output correction signal $\Delta P_1$ and is increased. In contrast, the guide vane opening degree command $Y_a$ and the rotating speed command $N_a$ remain unchanged at constant values.

As a result, the generator output P increases according to the generator output command $P_{0'}$, whereas the guide vane opening degree Y and the turbine output $P_T$ which are determined by the guide vane opening degree command $Y_a$ do not change. The illustrated example, however, shows that the quantities of the appropriate guide vane opening degree Y and the turbine output $P_T$ are decreasing toward values which correspond to the alteration at the point of time 0.

Therefore, the turbine output $P_T$ and the generator output P become $P > P_T$, and a decelerating torque acts on the pump turbine 2 and rapidly lowers the rotating speed N of the pump turbine 2. $N_1 < N_{1p}$ is held by the lowering of the rotating speed N, and the decision unit 25 restores $\Delta P_1 = 0$. Therefore, the varible speed hydropower plant apparatus in FIG. 1 is eventually stabilized with the quantities which correspond to the output after the lowering at the point of time 0. A turbine operating point after the stabilization becomes the point L in FIG. 4.

Figure 5:
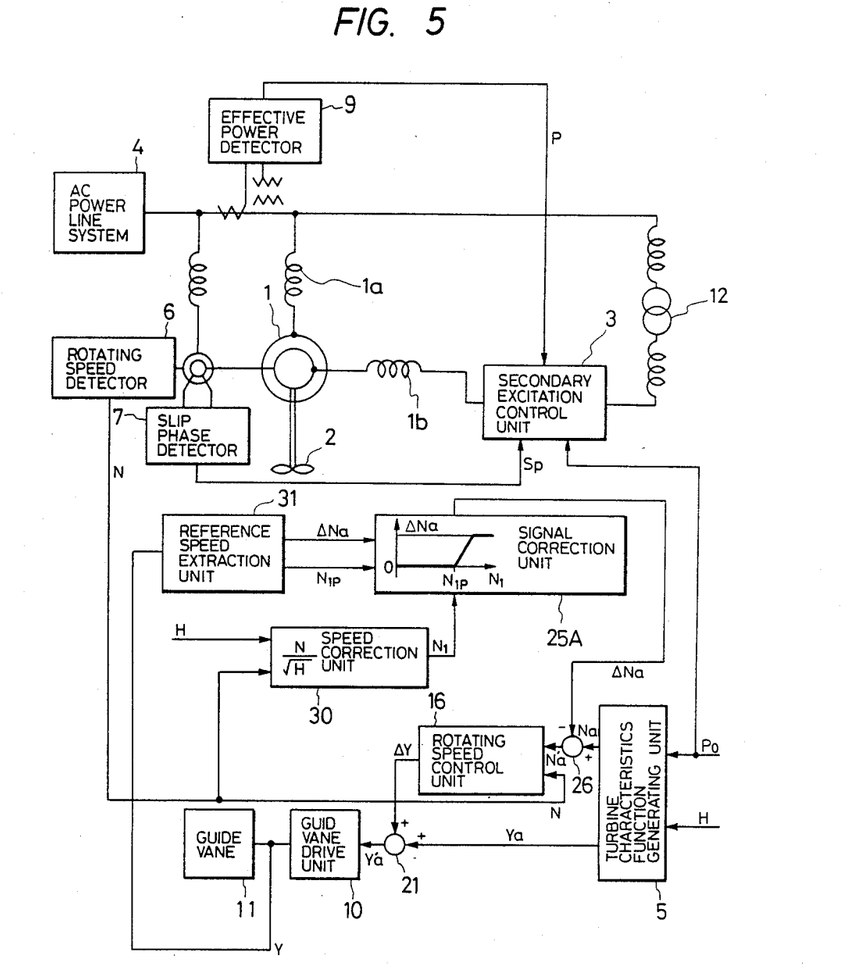
FIG. 5 is a block diagram of a control system of a variable speed hydro-power plant apparatus according to a second embodiment of the present invention.

FIG. 5 shows a second embodiment of the present invention. The output of the decision unit or signal correction circuit 25A is applied to the appropriate rotating speed command $N_a$, and the guide vane opening degree Y is finally controlled according to the corrected rotating speed command $N_{a'} = N_a - \Delta N_a$.

In this case, the correction signal is the rotating speed correction signal $\Delta N_a$ corresponding to the rotating speed N. Since the way of evaluating this correction signal in the decision unit 25A is the same as in the first embodiment of the present invention shown in FIG. 1, it shall not be explained here.

Figure 6:
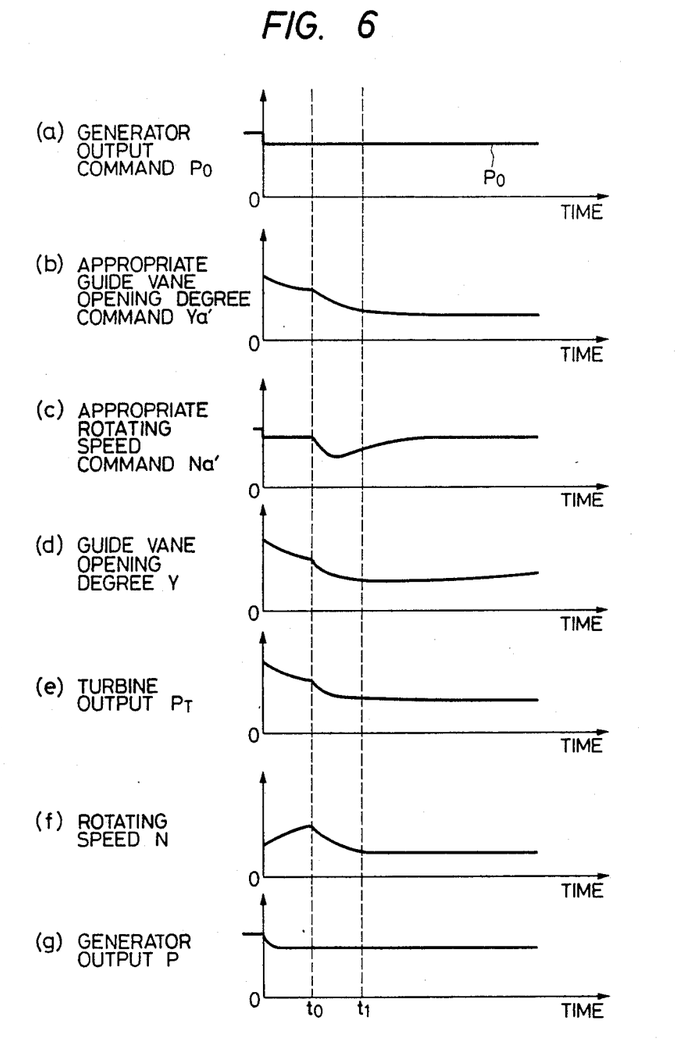
FIG. 6 is an explanatory diagram showing the signals of the various parts of the control units in FIG. 5 and illustrates at the sections (a) through (g) signal waveforms developing in FIG. 5.

FIG. 6 shows the wave-forms of various portions in the case where the generator output command $P_0$ decreases at a point of time 0, with the result that the turbine rotating speed N rises and that the decision unit 25A in FIG. 5 detects $N_1 > N_{1p}$ and delivers the rotating speed correction signal $\Delta N_a$ at a point of time $t_0$. Since operations up to the point of time $t_0$ in this figure are the same as in FIG. 3, operations after $t_0$ will be explained here.

First, the rotating speed correction signal $\Delta N_a$ acts so as to decrease the appropriate rotating speed command $N_a$, and the corrected rotating speed command $N_{a'}$ decreases rapidly after the point of time $t_0$. In addition, the final guide vane opening degree command $Y_{a'}$ is found in such a way that the appropriate guide vane opening degree command $Y_a$ and the guide vane opening degree correction command $\Delta Y$ obtained according to the corrected rotating speed command $N_{a'}$ are added by the adder 21.

Owing to the decrease of the corrected rotating speed command $N_{a'}$, therefore, also the final guide vane opening degree command $Y_{a'}$ throttles the guide vane opening degree Y rapidly. As a result, the turbine output $P_T$ decreases rapidly. In contrast, as regards the side of the generator output command $P_0$, this generator output command $P_0$ and the actual generator output P remain unchanged because the rotating speed correction signal $\Delta N_a$ for avoiding the inrush into the unstable turbine operation region does not act on the generator output command $P_0$ at all.

As a result, the turbine output $P_T$ and the generator output P after the point of time $t_0$ become $P > P_T$, a decelerating torque acts on the pump turbine 2 to lower the rotating speed N thereof, and the operation is extricated into the stable turbine operation region as stated in connection with FIG. 10. By the way, when $N_1 < N_{1p}$ has held owing to the lowering of the rotating speed N, the rotating speed correction signal $\Delta N_a$ becomes extinct, and the various quantities of the portions of the circuit arrangement in FIG. 5 are stabilized at values corresponding to the generator output command $P_0$.

As described above in detail, the variable speed hydro-power plant apparatuses of the first embodiment and the second embodiment of the present invention can be extricated into the stable turbine operation region by lowering the rotating speed of the pump turbine 2, and, and even in the transient stage, the frequency of the A.C. power line system 4 can be held constant.

More specifically, the system frequency f is the sum of the frequency $f_2$ of the secondary winding 1b and a frequency $f_w$ determined in correspondence with the rotating speed of the pump turbine 2. In this regard, the secondary excitation control unit 3 operates in order to keep the system frequency f constant in such a manner that the frequency $f_2$ decreases or increases by the fluctuating increment or decrement of the frequency $f_w$.

Next, modifications to which the present invention is applicable will be explained. Although, in the foregoing, the case of using the induction generator as a variable speed generator has been explained, the present invention is applicable without changing the purport thereof, also to a variable speed generator of the type in which a frequency converter is disposed on the primary side of the generator.

Besides, the present invention is also applicable to a variable speed hydro-power plant apparatus in which the secondary excitation control unit is driven by the composite signal of the generator output command and the rotating speed command, and the opening degree of the guide vane is controlled to the appropriate opening degree for highest efficiency.

Figure 7:
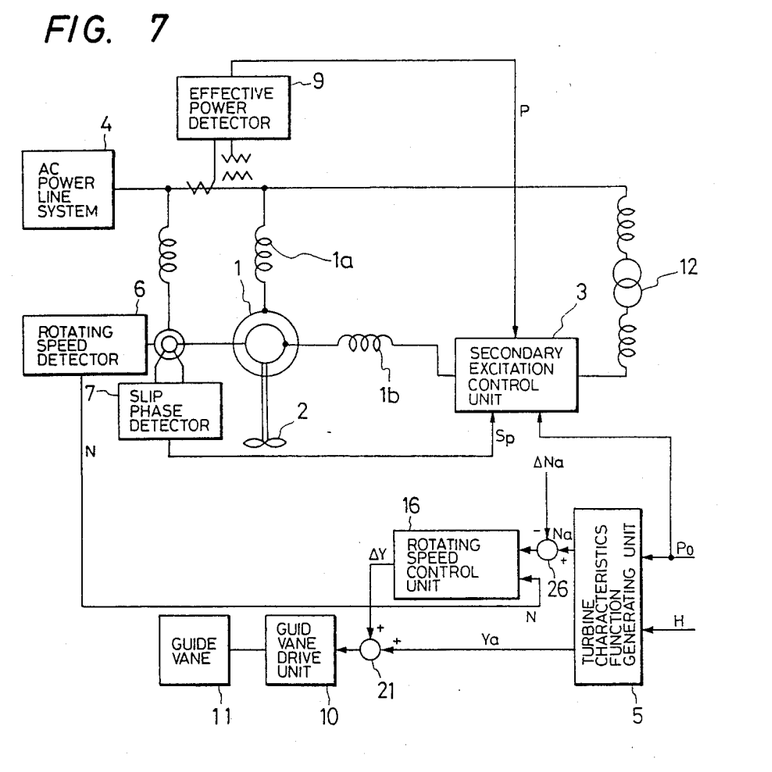
FIG. 7 is a block diagram of a control system of a variable speed hydro-power plant apparatus according to a third embodiment of the present invention.

A third embodiment of the present invention will be explained with reference to FIGS. 7 and 8.

When another hydraulic machinery sharing the upstream or downstream side pipe line is started in a turbine mode operation or is subjected to the operation of rapidly increasing an output, the water hammering phenomenon thereof is propagated through the shared pipe line, and hence, the effective head H of the particular variable speed hydro-power plant apparatus lowers.

Therefore, the rotating speed correction control for lowering the rotating speed N of the pump turbine 2 in the particular variable speed hydro-power plant apparatus is performed before, or simultaneously with, the start or output rapid increase operation of the hydraulic machinery. That is, the rotating speed deviation $\Delta N_a$ shown in FIG. 7 is temporarily input at a point of time $t_{11}$. In other words, the appropriate rotating speed command $N_a$ is corrected to $(N_a - \Delta N_a)$.

Figure 8:
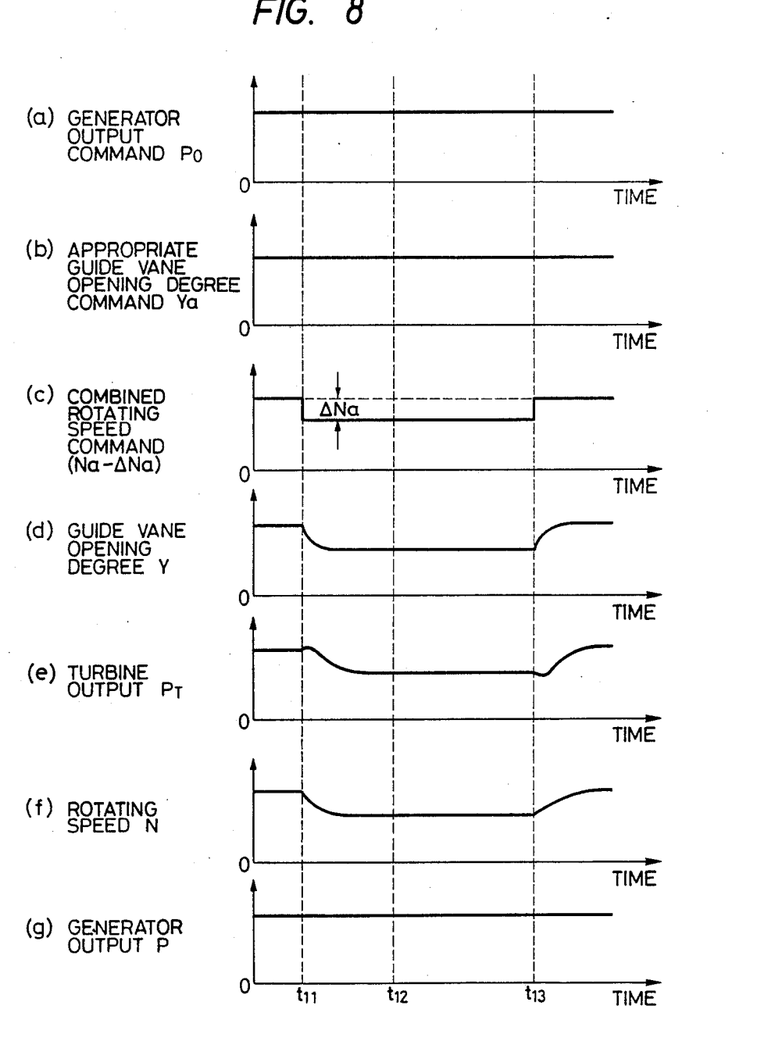
FIG. 8 is an explanatory diagram showing the signals of the various parts of the control units in FIG. 7 and illustrates at the sections (a) through (g) signal waveforms developing in FIG. 7.

The situations of the responses of the combined rotating speed command $(N_a - \Delta N_a)$, the guide vane opening degree Y, the turbine output $P_T$, the rotating speed N, etc. on this occasion are illustrated in FIG. 8.

At a point of time $t_{12}$, the rotating speed N of the pump turbine 2 can be completely corrected to $(N_a - \Delta N_a)$ while the generator output P from the generator 1 holds its original value.

The turbine mode operation start or output increase operation of the other hydraulic machinery sharing the pipe line may be performed at the point of time $t_{12}$, or may well be performed during the lowering of the rotating speed N of the particular variable speed machinery before time $t_{12}$.

Subsequently, at a point of time $t_{13}$, the rotating speed correction control based on the rotating speed deviation $\Delta N_a$ is released to restore the rotating speed N to the original appropriate rotating speed command $N_a$ after the rapid opening operation of the other hydraulic machinery has ended, or the water hammering in the shared pipe line has settled sufficiently.

Although, in the above stated third embodiment of the present invention, the variable speed hydro-power plant apparatus of the secondary excitation system has been explained, the present invention is also applicable to the variable speed hydro-power plant apparatus of a primary excitation system, namely, of the type in which a frequency converter is located on the primary side of the generator.

We claim:

1. In a turbine mode operation of a variable speed hydro-power plant apparatus having a pump turbine (2) which exhibits a S-shaped characteristics in a turbine operation region and includes variable guide vanes (11), and a generator (1) with a frequency converter, which is so constructed as to be driven by said pump turbine (2) and to hold a frequency of a generated electric power thereof equal to a frequency of an electric power system (4) in spite of the fact that a rotating speed (N) of said pump turbine (2) is changed in conformity with an operating state, a control system for said variable speed hydro-power plant apparatus characterized in that, upon detecting an approach of a turbine operating point of said variable speed hydro-power plant apparatus to an unstable turbine operation region, a rotating speed (N) of said pump turbine (2) is lowered.

2. In a control system for a variable speed hydro-power plant apparatus having a generator (1) whose primary winding (1a) is connected to an electric power system (4) and whose secondary winding (1b) is connected to said electric power system (4) through a secondary excitation control unit (3), and a pump turbine (2) which is directly coupled to a shaft of said generator (1) and which includes variable guide vanes (11), characterized in that, upon detecting an approach of a turbine operating point of said variable speed hydro-power plant apparatus to an unstable turbine operation region, a rotating speed (N) of said pump turbine (2) is lowered.

3. In a control system for a variable speed hydro-power plant apparatus having a generator (1) whose primary winding (1a) is connected to an electric power system (4) and whose secondary winding (1b) is connected to the electric power system (4) through a secondary excitation control unit (3), and a pump turbine (2) which is directly coupled to a shaft of said generator (1) and which includes variable guide vanes (11), characterized in that, upon detecting an approach of a turbine operating point of said variable speed hydro-power plant apparatus to an unstable turbine operation region, a mechanical power output ($P_T$) of said pump turbine (2) is made smaller than an output (P) from said generator (1).

4. In a control system for a variable speed hydro-power plant apparatus having a generator (1) whose primary winding (1a) is connected to an electric power system (4) and whose secondary winding (1b) is connected to said electric power system (4) through a secondary excitation control unit (3), a pump turbine (2) which is directly coupled to a shaft of said generator (1) and which includes variable guide vanes (11), a generator output controller (26) which acts on said secondary excitation control unit (3) so as to control an output from said generator (1), and a turbine output controller (10, 21, 5, 16) which acts on said variable guide vanes (11) so as to control a mechanical power output ($P_T$) of said pump turbine (2), characterized in that, upon detecting an approach of a turbine operating point of said variable speed hydro-power plant apparatus to an unstable turbine operation region, only said generator output (P) is increased through said generator output controller so as to make said turbine output ($P_T$) smaller than said generator output (P).

5. In a control system for a variable speed hydro-power plant apparatus having a generator (1) whose primary winding (1a) is connected to an electric power system (4) and whose secondary winding (1b) is connected to said electric power system (4) through a secondary excitation control unit (3), a pump turbine (2) which is directly coupled to a shaft of said generator (1) and which includes variable guide vanes (11), a generator output controller (26) which acts on said secondary excitation control unit (3) so as to control an output (P) from said generator (1), and a turbine output controller (10, 21, 5, 16) which acts on said variable guide vanes (11) so as to control mechanical power output ($P_T$) of said pump turbine (2), characterized in that, upon detecting an approach of a turbine operating point of said variable speed hydro-power plant apparatus to an unstable turbine operation region, only said turbine output ($P_T$) is decreased through said turbine output controller (10, 21, 5, 16) so as to make said turbine output ($P_T$) smaller than said generator output (P).

6. In a control system for a variable speed hydro-power plant apparatus having a generator (1) whose primary winding (1a) is connected to an electric power system (4) and whose secondary winding (1b) is connected to said electric power system (4) through a secondary excitation control unit (3), and a pump turbine (2) which is directly coupled to a shaft of said generator (1) and which includes variable guide vanes (11), characterized in that, in order to detect an approach of a turbine operating point of said variable speed hydro-power plant apparatus to an unstable turbine operation region, a rotating number per unit head ($N_1$) and a reference rotating speed ($N_{1P}$) evaluated from an opening degree (Y) of said variable guide vane (11) are compared, whereupon a rotating speed (N) of said pump turbine (2) is lowered.

7. In a control system for a variable speed hydro-power plant apparatus having a generator (1) whose primary winding (1a) is connected to an electric power system (4) and whose secondary winding (1b) is connected to said electric power system (4) through a secondary excitation control unit (3), and a pump turbine (2) which is directly coupled to a shaft of said generator (1) and which includes variable guide vanes (11), characterized in that, a current time turbine operating point is grasped on a turbine characteristics diagram of said pump turbine (2), a limit operation characteristics curve (nr) of said pump turbine (2) is formed in relation to said turbine characteristics diagram, upon detecting a reach of a turbine operating point of said variable speed hydro-power plant apparatus to said limit operation characteristics curve (nr) of said pump turbine (2), a rotating speed (N) of said pump turbine (2) is lowered.

8. In a control system for a variable speed hydro-power plant apparatus having a generator (1) whose primary winding (1a) is connected to an electric power system (4) and whose secondary winding (1b) is connected to said electric power system (4) through a secondary excitation control unit (3), and a pump turbine (2) which is directly coupled to a shaft of said generator (1) and which includes variable guide vanes (11), characterized in that, a current time turbine operating point is grasped on a turbine characteristics diagram of said pump turbine (2), a limit operation characteristics curve (nr) of said pump turbine (2) is formed in relation to said turbine characteristics diagram, upon detecting a reach of a turbine operating point of said variable speed hydro-power plant apparatus to said limit operation characteristics curve (nr) of said pump turbine (2), a mechanical power output ($P_T$) of said pump turbine (2) is made smaller than an output (P) from said generator (1).

9. In a control system for a variable speed hydro-power plant apparatus having a generator (1) whose primary winding (1a) is connected to an electric power system (4) and whose secondary winding (1b) is connected to said electric power system (4) through a secondary excitation control unit (3), a pump turbine (2) which is directly coupled to a shaft of said generator (1) and which includes variable guide vanes (11), a generator output controller (26) which acts on said secondary excitation control unit (3) so as to control an output from said generator (1), and a turbine output controller (10, 21, 5, 16) which acts on said variable guide vanes (11) so as to control a mechanical power output ($P_T$) of said pump turbine (2), characterized in that,
- a current time turbine operating point is grasped on a turbine characteristics diagram of said pump turbine (2),
- a limit operation characteristics curve (nr) of said pump turbine (2) is formed in relation to said turbine characteristics diagram,
- upon detecting a reach of a turbine operating point of said variable speed hydro-power plant apparatus to said limit operation characteristics curve (nr) of said pump turbine (2), only said generator output (P) is increased through said generator output controller (26) so as to make said turbine output ($P_T$) smaller than said generator output (P).

10. In a control system for a variable speed hydro-power plant apparatus having a generator (1) whose primary winding (1a) is connected to an electric power system (4) and whose secondary winding (1b) is connected to said electric power system (4) through a secondary excitation control unit (3), a pump turbine (2) which is directly coupled to a shaft of said generator (1) and which is includes variable guide vanes (11), a generator output controller (26) which acts on said second excitation control unit (3) so as to control an output (P) from said generator (1), and a turbine output controller (10, 21, 5, 16) which acts on said variable guide vanes (11) so as to control a mechanical power output ($P_T$) of said pump turbine (2), characterized in that,
- a current time turbine operating point is grasped on a turbine characteristics diagram of said pump turbine (2),
- a limit operation characteristics curve (nr) of said pump turbine (2) is formed in relation to said turbine characteristics diagram,
- upon detecting a reach of a turbine operating point of said variable speed hydro-power plant apparatus to said limit operation characteristics curve (nr) of said pump turbine (2), only said turbine output ($P_T$) is decreased through said turbine output controller (10, 21, 5, 16) so as to make said turbine input ($P_T$) smaller than said generator output (P).

11. A control system for a variable speed hydro-power plant apparatus as defined in claim 7, characterized in that said limit operation characteristics curve of said pump turbine (2) is a no-load flow rate curve (nr).

12. A control system for a variable speed hydro-power plant apparatus as defined in claim 8, characterized in that said limit operation characteristics curve of said pump turbine (2) is a no-load flow rate curve (nr).

13. A control system for a variable speed hydro-power plant apparatus as defined in claim 9, characterized in that said limit operation characteristics curve of said pump turbine (2) is a no-load flow rate curve (nr).

14. A control system for a variable speed hydro-power plant apparatus as defined in claim 10, characterized in that said limit operation characteristics curve of said pump turbine (2) is a no-load flow rate curve (nr).

15. In a turbine mode operation of a variable speed hydro-power plant apparatus sharing an upstream or downstream side pipe line with another hydraulic machinery and having a pump turbine (2) which exhibits a S-shaped characteristics in a turbine operation region and includes variable guide vanes (11), and a generator (1) with a frequency converter, which is so constructed as to be driven by said pump turbine (2) and to hold a frequency of a generated electric power thereof equal to a frequency of an electric power system (4) in spite of the fact that a rotating speed (N) of said pump turbine (2) is changed in conformity with an operating state, a control system for said variable speed hydro-power plant apparatus characterized in that,
- in case of abruptly changing an operating state of said other hydraulic machinery with which said upstream or downstream side pipe line is shared, said rotating speed (N) of said variable speed hydro-power plant apparatus is temporarily corrected and controlled, and said temporary rotating speed correction control is released after water hammering in said shared pipe line attendant upon said abrupt change of said operating state of said other hydraulic machinery has settled.

16. A control system for a variable speed hydro-power plant apparatus as defined in claim 15, characterized in that when said other hydraulic machinery with which said upstream or downstream side pipe line is shared is to start or rapidly increase its output in a turbine mode operation, said rotating speed correction control of lowering the rotating speed (N) of said variable speed hydro-power plant apparatus is performed before-hand.

17. A control system for a variable speed hydro-power plant apparatus as defined in claim 16, characterized in that said rotating speed correction control is validated in a limited specified operation region in accordance with a water head (H) or a rotating speed (N) of said pump turbine (2), an opening degree (Y) of said guide vane (11) or a their composite parameter on each occasion.

18. A control system for a variable speed hydro-power plant apparatus as defined in claim 15, characterized in that when said other hydraulic machinery with which said upstream or downstream side pipe line is shared is to start or operate so as to rapidly increase its output in a turbine mode operation, said rotating speed correction control of lowering the rotating speed (N) of said variable speed hydro-power plant apparatus is simultaneously performed.

19. A control system for a variable speed hydro-power plant apparatus as defined in claim 18, characterized in that said rotating speed correction control is validated in a limited specified operation region in accordance with a water head (H) or a rotating speed (N) of said pump turbine (2) or an opening degree (Y) of said guide vane (11) or a their composite parameter on each occasion.

* * * * *